April 11, 1961 T. J. SMULSKI 2,979,629
ELECTRIC CLOCK
Filed Nov. 29, 1955 10 Sheets-Sheet 1

INVENTOR.
THEODORE J. SMULSKI

INVENTOR.
THEODORE J. SMULSKI

INVENTOR.
THEODORE J SMULSKI

April 11, 1961 T. J. SMULSKI 2,979,629
ELECTRIC CLOCK

Filed Nov. 29, 1955 10 Sheets-Sheet 4

Fig.-7

INVENTOR.
THEODORE J. SMULSKI

April 11, 1961 T. J. SMULSKI 2,979,629
ELECTRIC CLOCK
Filed Nov. 29, 1955 10 Sheets-Sheet 6

INVENTOR.
THEODORE J. SMULSKI

April 11, 1961 T. J. SMULSKI 2,979,629
ELECTRIC CLOCK
Filed Nov. 29, 1955 10 Sheets-Sheet 7

INVENTOR.
THEODORE J. SMULSKI

April 11, 1961 T. J. SMULSKI 2,979,629
ELECTRIC CLOCK
Filed Nov. 29, 1955 10 Sheets-Sheet 10

INVENTOR.
THEODORE J. SMULSKI

United States Patent Office 2,979,629
Patented Apr. 11, 1961

2,979,629
ELECTRIC CLOCK
Theodore J. Smulski, Munster, Ind., assignor, by mesne assignments, to The Anderson Company, a corporation of Indiana Filed Nov. 29, 1955, Ser. No. 549,709
14 Claims. (Cl. 310—39)

This invention relates generally to a clock and more particularly to an electric clock.

In the clock of this invention, a pivotal oscillatory element is arranged to drive suitable clock mechanism as it oscillates, and electromechanical transducer means are provided for driving the oscillatory element, such means being energized in synchronism with the movement of the oscillatory element.

The electromechanical transducer means is preferably an electromagnetic arrangement in which the oscillatory element comprises an armature of a magnetic material, such as soft iron, disposed between two poles of an electromagnet, the armature being urged by magnetic forces into alignment with the magnetic flux path between the poles when the electromagnet is energized. A specific feature of the invention is in the construction of the electromagnet by which the poles can be readily adjusted into properly spaced relation to the armature and in which the strength, magnetic, of the magnet can be readily adjusted.

The oscillatory element may be urged toward a neutral position by a restoring force, either from gravity or preferably from a suitable hair spring, and may move in one direction from a first position through such neutral position to a second position and then in a reverse direction back through the neutral position to the first position. The transducer means is preferably such that it acts generally in opposition to the restoring force so that when the oscillatory element is between the first position and the neutral position, energization of the transducer means will urge the element toward such first position, while when the element is between the neutral position and the second position, energization of the transducer means will urge the element toward such second position. According to an important feature of the invention, contact means are controlled by movement of the oscillatory element for energizing the transducer means when the element moves in either direction beyond such neutral position.

The contact arrangement preferably comprises an actuating member carried by the oscillator element, and a reciprocable switch-controlling member having a portion in the path of such actuating member to be actuated in one direction when the oscillatory element moves in one direction and in a reverse direction when the oscillatory element moves in the reverse direction, the switch being arranged to energize the transducer means when such reciprocable member swings to a certain extent in either direction.

In accordance with a further specific feature of the invention, the reciprocable switch-actuating member does not itself effect positive actuation of switch contacts, but is effective only to release a contact member into a closed position, such contact member being moved to open position by a suitable cam carried by the oscillatory element and being maintained in open position until released from actuation of the reciprocable control member. This arrangement is distinctly advantageous in that contact closing is controlled by such reciprocable member, while contact opening is controlled by the cam member, and it is possible to accurately adjust the portions of the cycle of operation when the transducer means is energized, so as to obtain drive of the oscillatory element which will not effect the accuracy of operation. Further, by virtue of the separate control of contact closing and contact opening, more reliable operation is assured. In addition, a single set of contacts is used to energize the transducer means in both directions of movement of the oscillatory element.

Still another advantage of the contact arrangement of this invention is that it is arranged so that there is no "dead" position and operation of the mechanism will be initiated any time that it is connected to a power source.

The clock preferably incorporates a mechanism driven in one direction from oscillatory movement of the element, the drive arrangement preferably being such that drive is important in about the same portions of the cycle as those in which the transducer means is energized, to minimize any effect on the time period of the oscillatory movement.

An object of this invention, accordingly, is to provide an improved clock mechanism.

A more specific object of this invention is to provide an improved electric clock having a readily adjustable electromagnet assembly.

Another object of this invention is to provide an improved clock mechanism having contacting means which are efficient and reliable in operation and readily adjustable.

This invention contemplates other and more specific objects, features and advantages which will become more fully apparent from the following detailed description taken in conjunction with the accompanying drawings which illustrate a preferred embodiment and in which:

Reference numeral 30 generally designates a clock constructed in accordance with the principles of this invention which may be arranged to be mounted on a panel 31, such as the instrument panel of an automobile, and which may have a conventional dial 32, an hour hand 33 and a minute hand 34.

Figure 3:
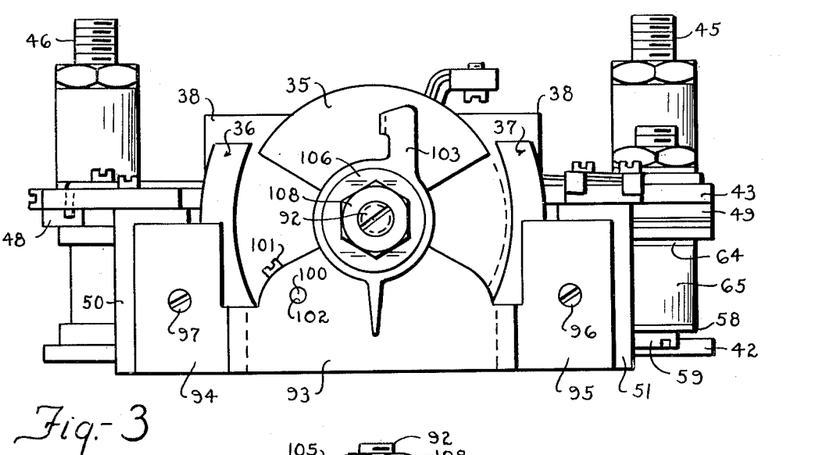
Figure 3 is a top plan view of the mechanism of Figure 2.
Figure 4:
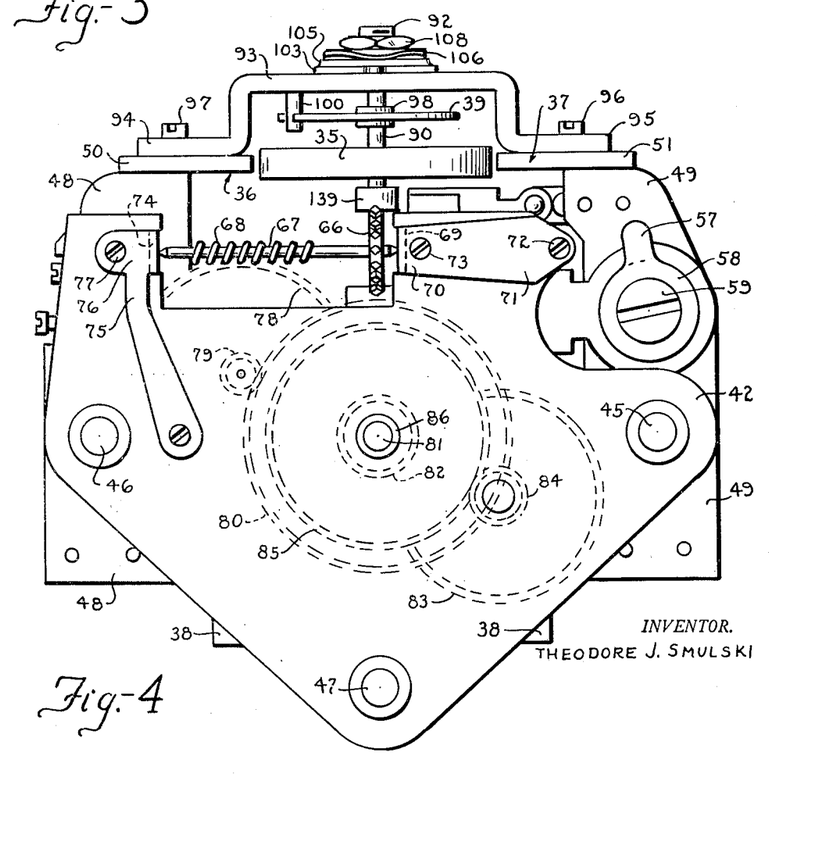
Figure 4 is a front elevational view of the mechanism of Figure 2.

In general, the mechanism of the clock 30 includes a pivotal oscillatory element 35 in the form of an armature of magnetic material movable between a pair of pole elements 36 and 37 of an electromagnet having an energizing coil 38. The armature element 35 is urged by a suitable spiral hair spring 39 to a neutral position such as illustrated in the plan view of Figure 3 and, when the coil 38 of the electromagnet is energized, the armature 35 will be oscillated by the magnetic forces of the electromagnet into alignment with the flux between the poles 36 and 37.

It will be appreciated that the element 35 will tend to oscillate at a rate determined by its inertia and the characteristics of the spring 39 and, by energizing the electromagnet coil 38 at appropriate portions of the cycle of movement of the element 35, it may be maintained in oscillation. Accordingly, a contact arrangement, indicated generally at 40, is provided which is actuated by movement of the element 35 to control energization of the coil 38, this assembly forming an important feature of the invention as will be described in detail hereinafter.

Means generally designated by reference numeral 41 (Figures 5 and 15) are provided for transforming the reciprocating oscillatory movement of the element 35 into rotary movement which is used to drive the hands 33 and 34 through a suitable gear train, as will be described.

Figure 5:
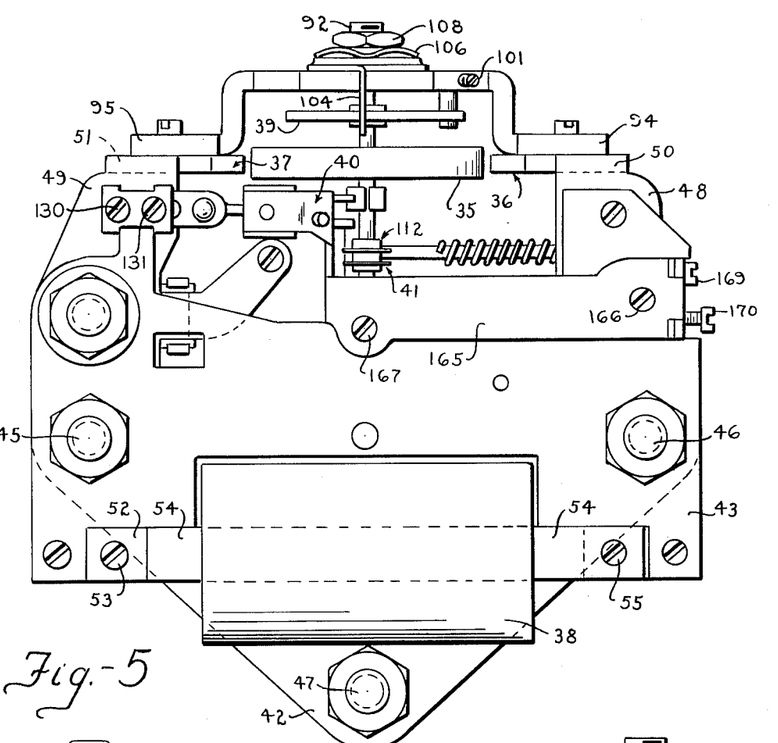
Figure 5 is a rear elevational view of the mechanism of Figure 2.
Figure 6:
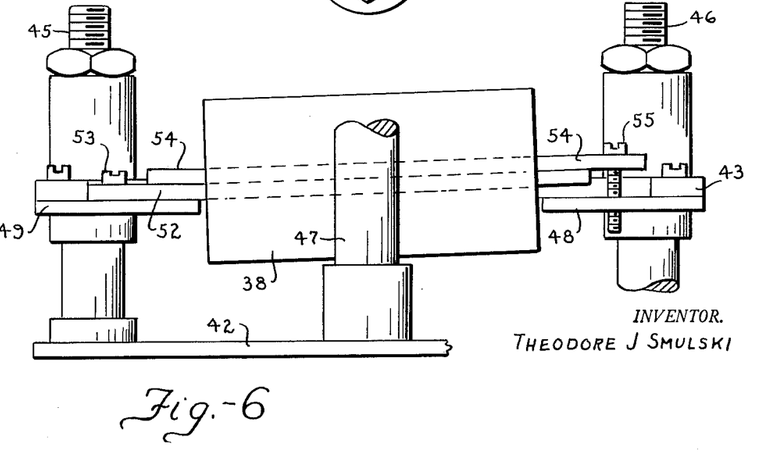
Figure 6 is a bottom plan view of the mechanism of Figure 2.
Figure 7:
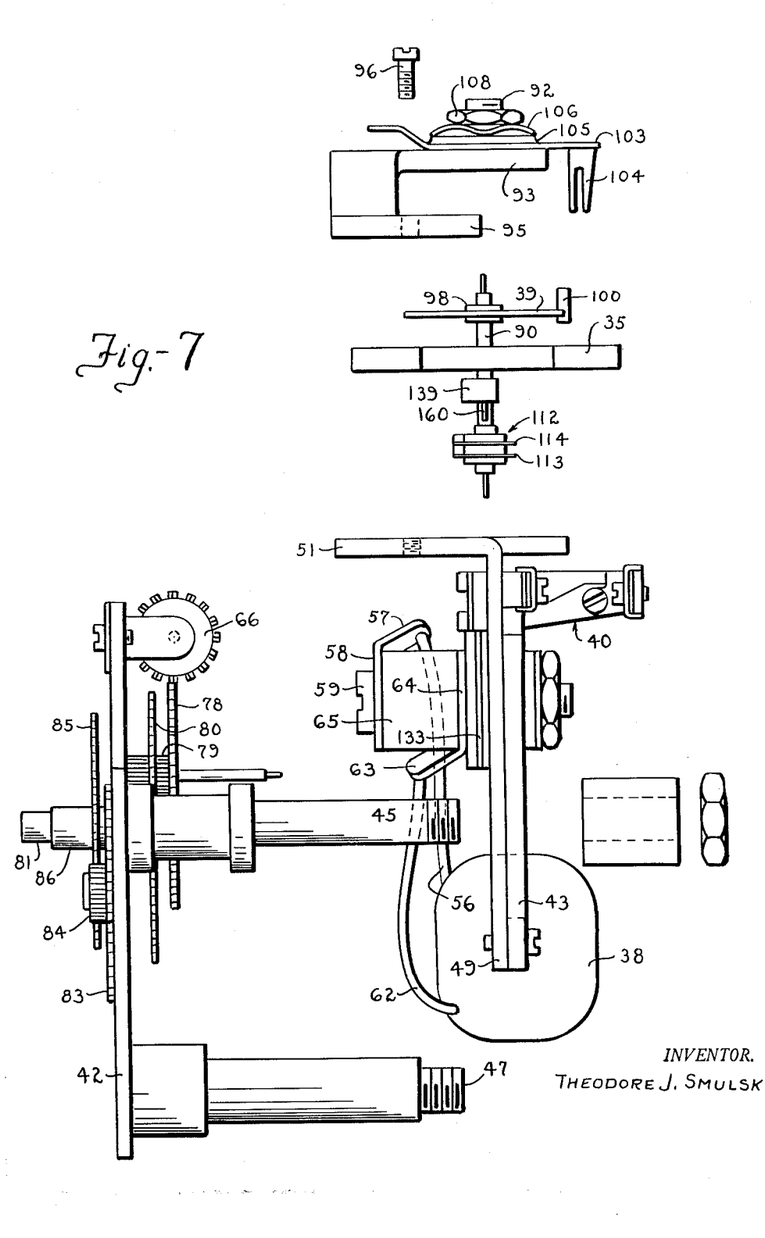
Figure 7 is an assembly view of the mechanism of Figure 2.

The mechanism of the clock 30 may be supported from a forward vertical frame plate 42 and a rearward frame plate 43 which are supported in fixed parallel relation to each other and to a housing 44 by means of posts 45, 46 and 47 (Figure 5). The frame plates 42 and 43 and especially the rearward plate 43, are preferably of a nonmagnetic material such as brass and a pair of plates 48 and 49 (Figures 20–24) of magnetic material, such as iron or steel, are disposed on the forward face of the rearward plate 43, adjacent opposite side portions thereof, the plates 48 and 49 having forwardly turned upper end portions 50 and 51 which may be formed to define the poles 36 and 37 in a manner as will be described in detail hereinafter. A core element 52 (Figures 5–6), of magnetic material, is secured by a screw 53 to the lower rearward surface of the plate 49 and extends inside the coil 38 with a second core element 54 secured against the element 52 being connected to the lower end of the plate 48 through an adjustment screw 55. The elements 52 and 54 are preferably so formed that their inherent resiliency urges the right-hand end thereof (as viewed in Figures 5 and 6) away from the plate 48, and by rotating the screw 55 the core elements 54 may be moved toward and away from the plate 48 to vary the air gap and thus vary the strength of the magnetic field produced by the coil 38.

Figure 1:
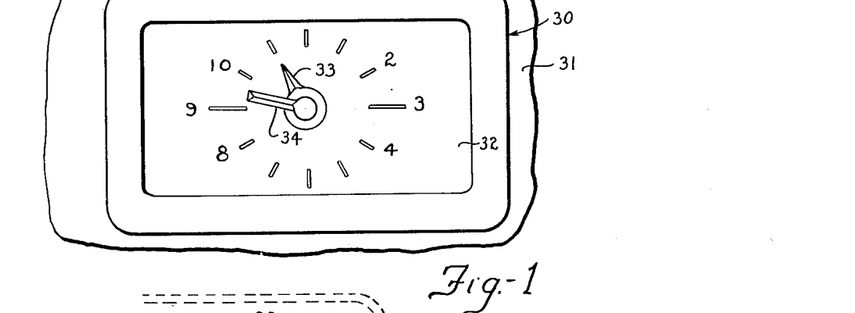
Figure 1 is a front elevational view of a clock constructed in accordance with the principles of this invention.
Figure 2:
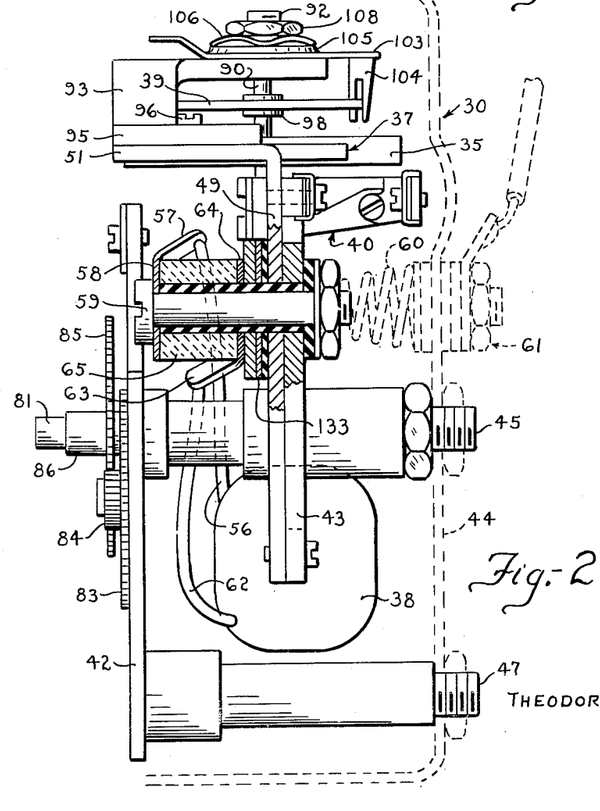
Figure 2 is a side elevational view of the mechanism of the clock of Figure 1, certain portions being shown in section.

To energize the coil 38, one end thereof is connected through a wire 56 to a lug 57 of a terminal plate 58 at one end of a terminal post 59 (Figures 2 and 22), the other end of the terminal post 59 being arranged to be connected through a contact spring 60 to a terminal 61 on the housing 44 arranged to be connected to one terminal of a source such as a battery. The other end of the coil 38 is connected through a wire 62 to a lug 63 of a terminal plate 64 on the post 59 in spaced relation to the plate 58, with a resistance element 65 between the plates 58 and 64, to absorb energy released by the coil 38 when it is deenergized. The plate 64 is arranged to be connected through the contact assembly 40 to the frame of the mechanism which is arranged to be connected to a terminal of the source, thus completing the circuit through the coil 38.

Figure 8:
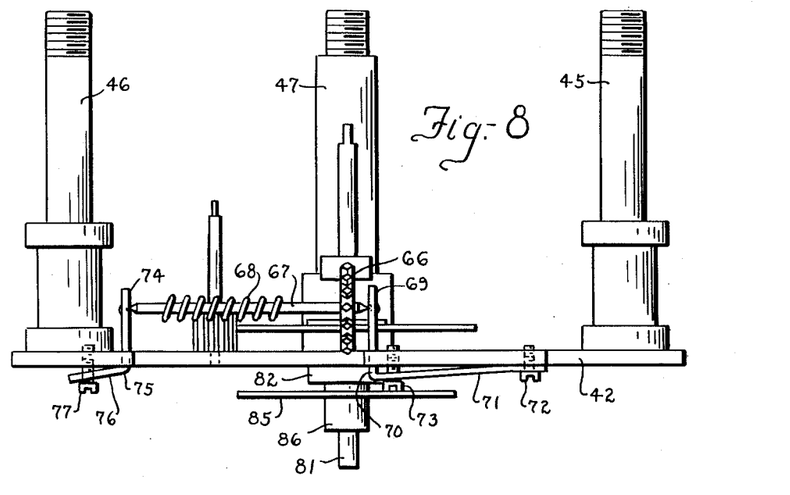
Figure 8 is a top plan view of an assembly of only certain elements of the mechanism of Figure 2.
Figures 9, 10:
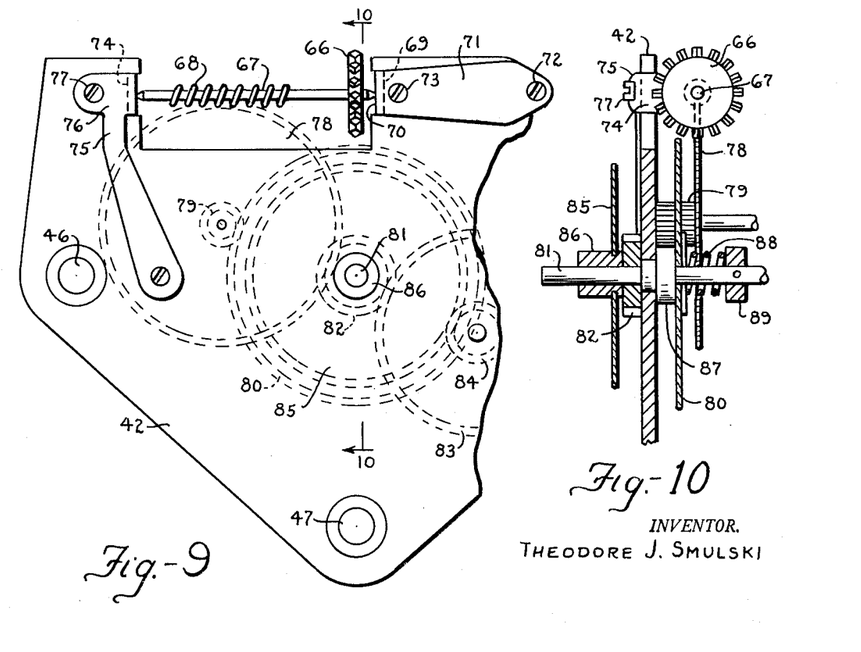
Figure 9 is a rear elevational view of the assembly of Figure 8.
Figure 10 is a cross-sectional view taken substantially along line 10——10 of Figure 9.
Figure 11:
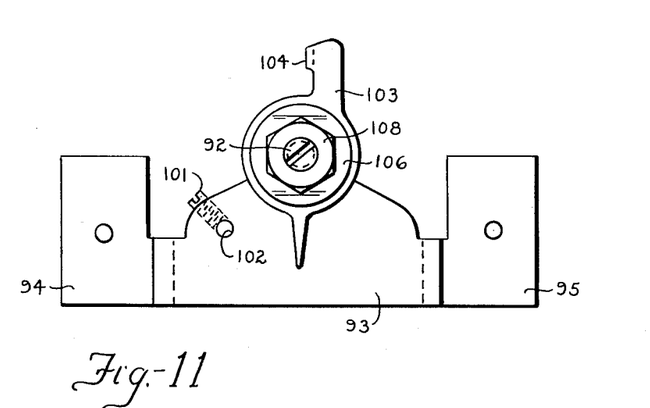
Figure 11 is a top plan view of a bearing support arrangement of the mechanism of Figure 2.
Figure 12:
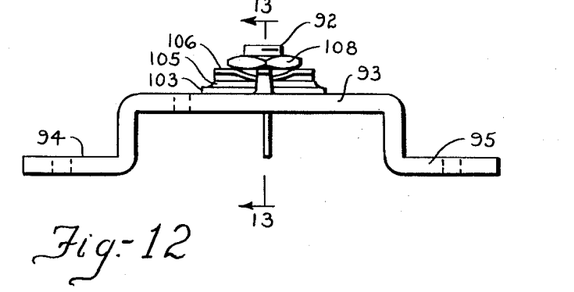
Figure 12 is a rear elevational view of the arrangement of Figure 11.
Figure 13:
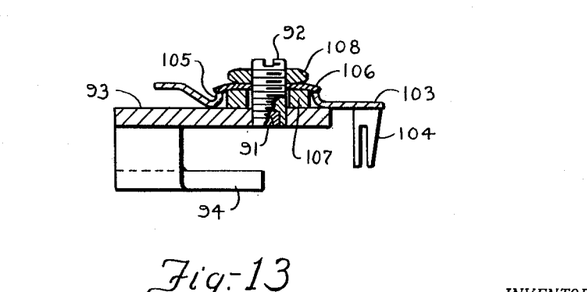
Figure 13 is a sectional view taken substantially along line 13—13 of Figure 12.

As above indicated, the mechanism 41 is arranged to convert the oscillatory movement of the element 35 into rotating movement. This mechanism, as best shown in Figures 8 and 9, will be described in detail hereinafter, but it may here be noted that it is arranged to drive a toothed wheel 66 which is secured on a shaft 67 which carries a worm 68. A specific feature of the invention is in the mounting of the shaft 67. In accordance with this feature, the end of the shaft 67 adjacent the wheel 66 is journalled by one leg 69 of a generally L-shaped bracket 70 having a second leg 71 secured at its end against the forward face of the plate 42 by a screw 72. The bracket 70 is so formed that through its own inherent resiliency the leg 69 is urged forwardly with the inner end of the leg 71 being spaced from the plate 42, and an adjustment screw 73 extends through the inner end portion of the leg 71 and is threaded into the plate 42, so that by adjustment of the screw 73 the leg 69 may be moved forwardly or rearwardly to thus move the end of the shaft 67 forwardly or rearwardly, this adjustment being desirable to obtain accurate and reliable operation of the mechanism 41 as will appear hereinafter. The other end of the shaft 67 is journalled by one leg 74 of a generally L-shaped bracket 75 having a second leg 76 secured to the plate 42 by a screw 77. The plate or bracket 75 is so formed that the pressure between the leg 74 and the shaft 67 may be adjusted by means of the screw 77.

The worm 68 (Figure 9) meshes with a worm wheel 78 which carries a pinion 79 which meshes with a gear 80 secured on a shaft 81 which carries the minute hand 34. The shaft 81 may carry a pinion 82 meshed with a wheel 83 which carries a pinion 84 meshed with a gear 85 on a sleeve 86 which may support the hour hand 33. To allow setting of the hands of the clock, there may be a frictional drive between the wheel 80 and the shaft 81 in which the wheel 80 may be urged against a collar 87 on the shaft 81 by a coiled compression spring 88 acting between the wheel 80 and a collar 89 secured to the shaft 81.

The oscillatory armature element 35 (Figure 15) is supported on a vertical shaft 90, the upper end of which is journalled by a bearing 91 fitted into the lower end of a screw 92 threaded into a bracket 93 having ends 94 and 95 secured by screws 96 and 97 to the flange portions 50 and 51 of the members 48 and 49.

Figure 14:
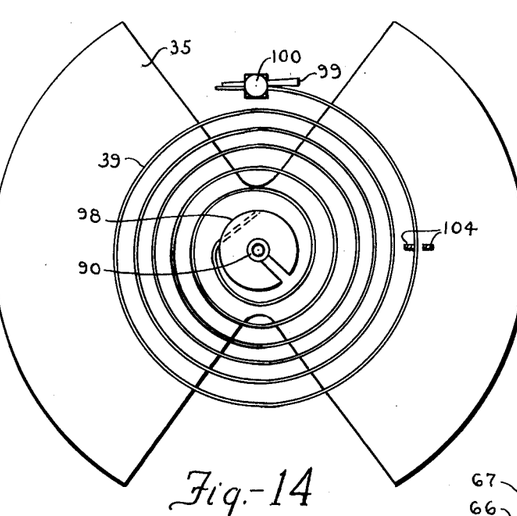
Figure 14 is a top plan view of the oscillatory armature element and associated spring of the mechanism of Figure 2.

The spiral hair spring 39 (Figures 14 and 15) has its inner end secured in a collar 98 on the shaft 90 and its outer end secured by a locking wedge 99 in an opening in a plug 100 secured by a screw 101 (Figure 3) in an opening 102 in the bracket 93.

For adjusting the effective action of the coiled hair spring 39, a plate 103 pivotal about the axis of the screw 92 has a down-turned bifurcated portion 104 embracing a point of the outer convolution of the hair spring 39, the effective tension of the spring 39 being adjustable by rotation of the plate 103. To journal the plate 103, it may have an up-turned annular flange portion 105 engaged by a corrugated resilient washer 106, the washer 106 being spaced from the bracket 93 by a washer 107 with a nut 108 threaded on the screw 92 to hold the washer 106 against the annular flange 105 of the plate 103. It will be appreciated, of course, that the pressure between the bearing 91 and the upper end of the shaft 90 may be adjusted by means of the screw 92.

Figure 15:
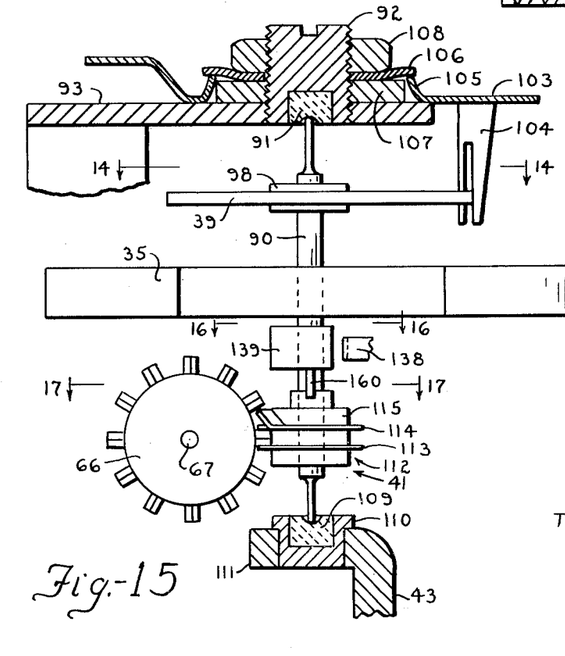
Figure 15 is a side elevational view of the arrangement of Figure 14.

As shown in Figure 15, the lower end of the shaft 90 is journalled in a bearing plug 109 carried by a collar 110 which is press-fitted into a lug portion 111 of the rearward frame plate 43.

Figure 18:
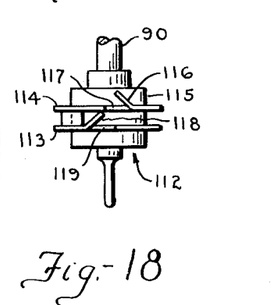

The mechanism 41 for transforming the oscillatory movement of the element 35 into rotary movement comprises (Figure 15) the toothed wheel 66 above described and a device 112 secured on the shaft 90 and illustrated in Figures 15 and 18. The device 112 comprises a pair of vertically spaced discs 113 and 114 secured on a hub 115 which is in turn secured on the shaft 90, the upper disc 114 having an annularly upwardly projecting struck-out portion 116 defining an opening 117 therein, and the lower disc 113 having a struck-out portion 118 extending upwardly to one side of the opening 117 and defining an opening 119 on the periphery of the disc 113.

In operation, a tooth of the wheel 66 may be disposed between the discs 113 and 114 and when the shaft 90 is rotated in one direction (clockwise, as viewed from below) the portion 118 of the disc 113 will cammingly engage such tooth and force it downwardly through the opening 119. The next tooth of the wheel 66 will then be disposed just above the upper disc 114 and when the shaft 90 is rotated in a reverse direction (counterclockwise as viewed from below) the portion 116 of the upper disc 114 will cammingly engage such tooth and force it downwardly through the opening 117 into the space between the discs 114 and 113. This cycle will be repeated with each oscillation of the shaft 90 and it will be appreciated that a drive of the wheel 66 in one direction is achieved.

It might here be noted that by virtue of the support arrangement for the end of the shaft 67 adjacent the wheel 66, the position of the wheel 66 relative to the device 112 may be readily adjusted so as to obtain efficient operation of the mechanism 41.

Figure 19:
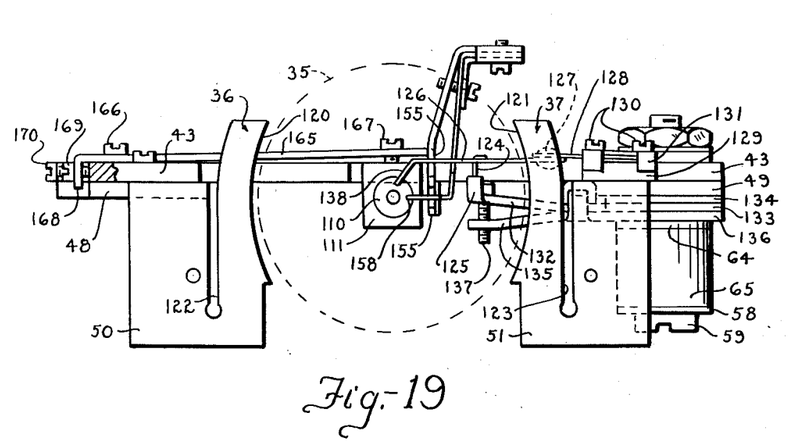
Figure 19 is a top plan view of an assembly of only certain elements of the mechanism of Figure 2.
Figure 20:
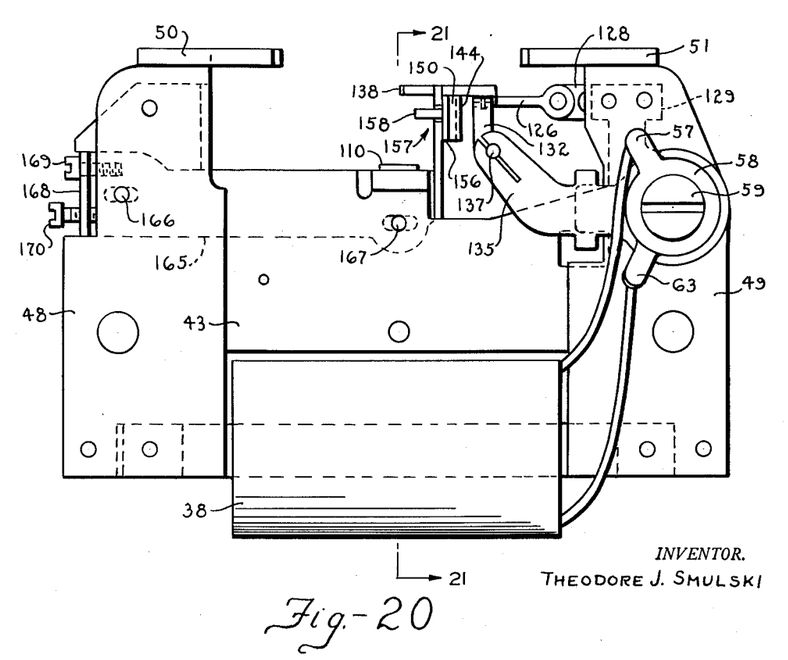
Figure 20 is a front elevational view of the arrangement of Figure 19.
Figure 21:
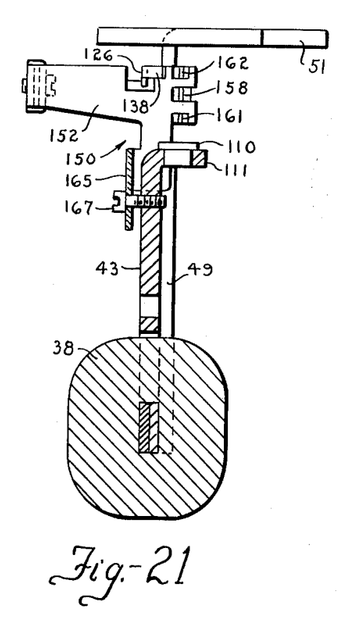
Figure 21 is a sectional view taken substantially along line 21—21 of Figure 20.
Figure 22:
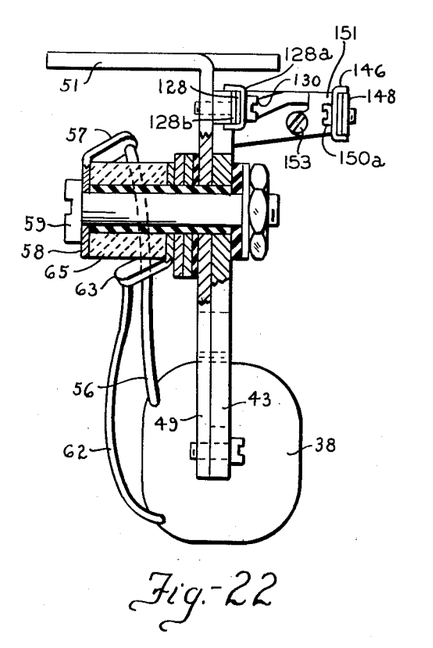
Figure 22 is a side elevational view of the arrangement of Figure 20, certain portions being shown in section.
Figures 23, 24:
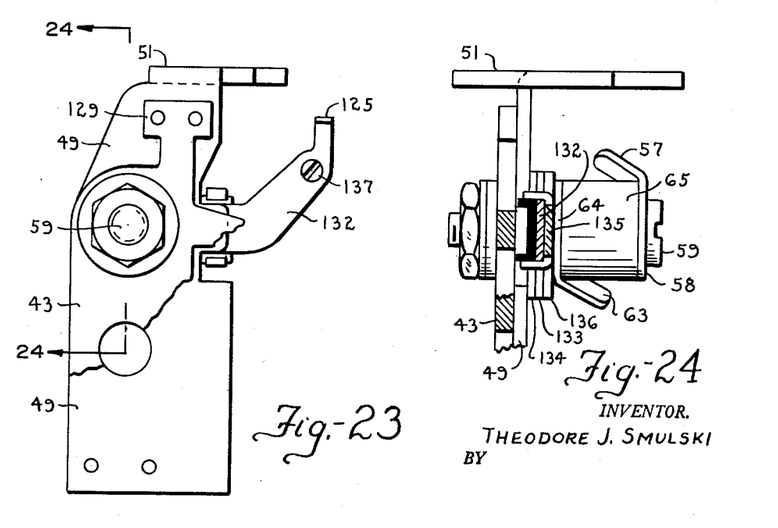
Figure 23 is a rear elevational view of a right-hand portion of the assembly as viewed in Figure 20.
Figure 24 is a sectional view taken substantially along line 24—24 of Figure 23.

A specific feature of the invention is in the construction of the poles 36 and 37 so that they may be readily adjusted into optimum relation to the armature element 35. As shown in Figure 19, the flange portions 50 and 51 of the members 48 and 49, which flange portions define the poles 36 and 37, have arcuate edges 120 and 121 complementary to the periphery of the element 35, and slots 122 and 123 are formed in the flange portions 50 and 51 in spaced generally parallel relation to the edges 120 and 121. By inserting the blade of a screwdriver or similar tool into the slots 122 and 123, the edges 120 and 121 may be readily brought into properly spaced relation to the periphery of the element 35. This subject matter is claimed more particularly in my divisional application Serial No. 757,883, filed August 28, 1958.

A highly important feature of the invention is in the construction of the contact means 40 for energizing the coil 38 in synchronism with the oscillatory movement of the element 35. In particular, the contact means 40 (Figures 27 and 28) comprises a movable contact 124 engageable with a stationary contact 125, the contact 125 being connected to the plate 64 and thus to one side of the coil 38 with the movable contact 124 being electrically connected to the frame of the mechanism, so that when the contact 124 is engaged with the contact 125, a circuit is completed through the coil 38.

The movable contact 124 is preferably formed of a separate piece of flat stock of a suitable electric contact material, such as silver or platinum, and is fixedly secured by welding or soldering to a relatively rigid actuating arm 126. The contact 124 actually lies normal to the plane of the arm 126 and depends therefrom so that only the free edge of the contact proper is utilized as the contacting area, as will be later apparent. The arm 126 is riveted, as at 127, or otherwise secured to one end of a flat spring 128, the other end of the spring being interposed between a pair of spring plates 128a and 128b secured to a portion 129 of the rearward frame plate 43 by a screw 130. A second screw 131 is threadedly received by the plate portion 129 and serves to urge the offset outer ends of the spring plates 128a and 128b toward the frame plate portion 129. Obviously, adjustment of the screw 131 toward the portion 129 will urge the contact 124 downwardly (as viewed in Figure 27) to increase the contact pressure between the contacts 124 and 125. Conversely, loosening of the screw 131 will relieve the contact pressure.

The stationary, but adjustable contact 125 is similar to the contact 124 and is a separate contact element secured to a resilient arm 132 having a portion 133 secured to the terminal post 59, an insulating washer 134 being disposed between the portion 133 and the member 49. A second arm 135 of configuration similar to the arm 132, but rigid throughout its length, has a portion in spaced relation in front of the arm 132 and a portion 136 disposed between the portion 133 of the member 132 and the plate 64 on the terminal post 59, to complete an electrical circuit therebetween. A screw 137 extends through the arm 132 and is threaded into the arm 135, so that by rotation of the screw 137, the position of the fixed contact 125 may be adjusted. It will be noted from Figure 29 that the contacting edges of the contacts 124 and 125 lie normal to one another, and the resulting very small contact area requires very little contact pressure, thereby reducing the load on the contact actuating mechanism.

Figure 27:
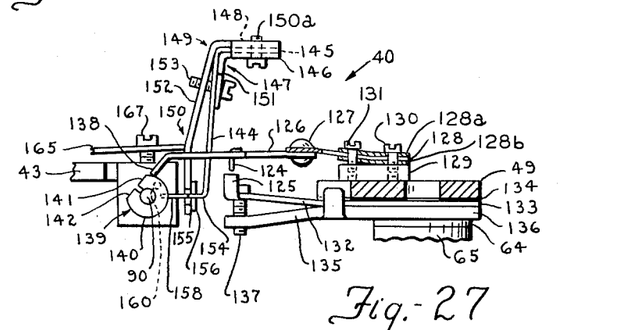
Figures 27 and 28 are top plan views of the contacting arrangement, showing alternative positions of the elements.
Figures 28, 29:
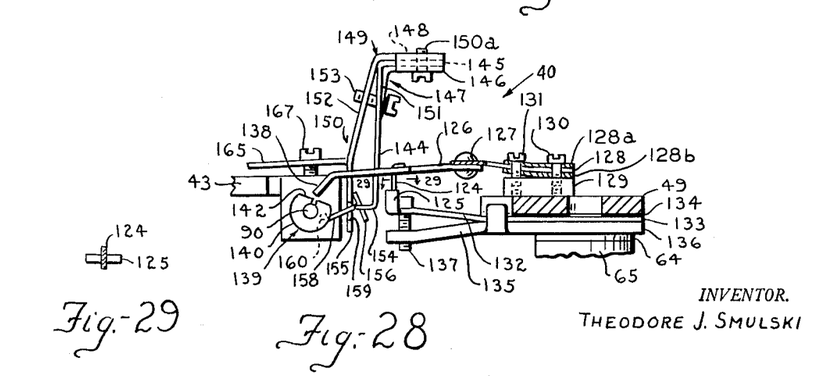
Figure 29 is a fragmentary sectional view taken along the plane 29—29 of Figure 28.

The contact arm 126 is so supported that it urges the contact 124 into engagement with the contact 125. To disengage the contact 124 from the contact 125, the arm 126 has an end portion 138 actuated by a cam member 139 affixed to the shaft 90. The cam 139 has a cylindrical surface portion 140 concentric to the axis of the shaft 90 and a pair of coplanar flat surfaces 141 and 142. When the shaft 90 rotates in a counterclockwise direction, the surface 140 may engage the end portion 138 of the arm 126 to move the contact 124 out of engagement with the contact 125, as shown in Figure 27, and when the shaft 90 is rotated in a clockwise direction, and portion 138 of arm 126 is over either coplanar surface 141 or 142, as shown in Figure 28, arm 126 is allowed to move so as to engage the contact 124 with the contact 125 after which the surface 140 may again engage the end portion 138 of the arm 126 to disengage the contact 124 from the contact 125.

Figure 26:
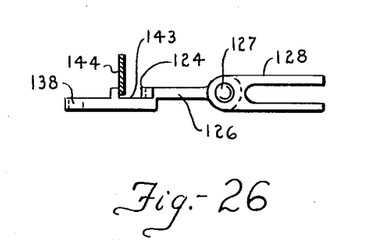

Means are provided for releasably maintaining the arm 126 in a position with the contacts disengaged. In particular (Figure 26), a slot 143 is formed in the arm 126 in proximity to the contact 124 and a resilient control arm 144 is arranged to frictionally engage one side edge of the slot, to maintain the arm in a position with the contacts disengaged, when it is moved by the cam faces 141, 142 into such a position.

The control arm 144 has a supporting leg or flange portion 145 extending normally from its rearward end, the flange portion 145 being disposed between one leg 146 of a generally L-shaped clamping member 147 and one leg 148 of a generally L-shaped portion 149 of a support bracket generally designated by reference numeral 150. A screw 150a extends through the flange portion 146 and the leg 145 and is threaded into the leg 148 to rigidly secure the flange portion 145 to the bracket 150 (Figure 27).

To adjust the frictional engagement between the control arm 144 and the edge of the slot 143 in the arm 126, a rearward end portion of the arm 144 (referring especially to Figures 22, 27, and 28) is disposed between a first arm 151 of the clamping member 147 and a second leg 152 of the L-shaped portion 149 of the bracket 150 with a screw 153 extending through the leg 151 and threaded into the leg 152, the control arm 144 being moved toward or away from the leg 152 by rotation of the screw 153 to adjust the frictional engagement between the arm 144 and that edge of the slot 143 in the arm 126 which is remote from the contact 124.

Figure 16:
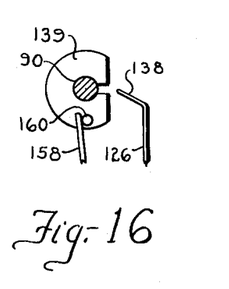
Figures 16, 17 and 18 are detail views of certain portions of the mechanism of Figures 14 and 15.
Figure 17:
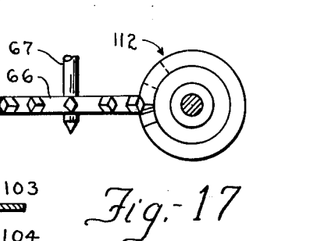
Figure 25:
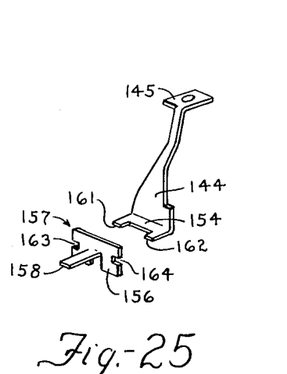
Figures 25 and 26 are detail views of certain elements of the contacting mechanism of the mechanism of Figure 2.

For actuating the control arm 144 to release the contact arm 126 so that the contacts 124 and 125 may abut, the arm 144 has a forwardly projecting flange 154 at its lower end (Figure 25). The flange 154 engages a base portion 156 of a rockable or reciprocable release plate 157 which has an integral leg portion 158 extending through an opening 159 in the control bracket 150 to lie in the path of an actuating pin 160 (Figure 16) carried by the cam member 139. The flange 154 of the control arm 144 has a pair of projections 161 and 162 extending into slots 163 and 164 in the base portion 156 of the plate 157, to maintain the plate 157 and the arm 144 in proper relation.

In operation, when the shaft 90 rotates in one direction, for example clockwise as viewed in Figures 27 and 28, the pin 160 will engage the leg 158 of the plate 157 to rock the plate about the point of engagement of the rearward edge of the base portion 156 thereof with the portion 155 of the support bracket 150 and the base portion 156 will serve to move the forward end of the control arm 144 to the right, as illustrated in Figure 28, moving the arm 144 to reduce frictional engagement with the edge of the slot 143 in the contact arm 126, to thus release the arm 126 and allow the contact 124 to engage the contact 125. Similarly, when the shaft 90 is rotated in a counterclockwise direction, the pin 160 may engage the leg 158 of the device 157 to rock the device about the point of engagement of the base portion 156 with the portion 155 of the support bracket 150 and thus move the control arm 144 and reduce frictional engagement with the edge of the slot 143, and thus again allow movement of the arm 126 to engage the contact 124 with the contact 125.

It will, accordingly, be appreciated that the disengagement or opening of the contacts 124, 125 is controlled by the engagement of the cam faces 141, 142 with the end portion 138 of the arm 126, while engagement or closing of the contacts 124, 125 is controlled by the operation of the rockable device 157 which also is responsive to oscillation of the shaft 90. The opening time can be adjusted by adjusting the position of the screw 137, this adjustment being independent of the adjustment of the closing time.

To equalize the closing time of the contacts 124 and 125 in each oscillatory cycle of the shaft 90, the relative positions of the portions 149, 155 of the support bracket 150 may be adjusted. For this purpose, the support bracket 150 has a base portion 165 having one end integrally secured to the portions 149 and 155, with the other end thereof secured tightly against the rearward face of the rearward frame plate 43 by a screw 166 (Figure 19). The base portion 165 of the bracket 150 is so formed that the end thereof adjacent the portions 149, 155 is urged by the inherent resiliency of the portion 165 in a rearward direction away from the rearward face of the rearward frame plate 43, and a screw 167 extends through the portion 165 adjacent the portions 149, 155 and is threaded into the frame plate 43. Rotation of the screw 167 adjusts the leg 152 to position the release plate 157 relative to the cam plate 139 and particularly with relation to the cam plate pin 160. By this adjustment, the plate 157 can be set so that the contacts 124, 125 are closed for the same length of time regardless of the direction of oscillation of the shaft 90.

As mentioned above, the screw 153 is used to initially set the frictional pressure between the control arm 144 and the edge of the slot 143 in the contact arm 126. The support bracket 150 is assembled on the frame plate 43 by the screws 166, 167, 169 and 170 to retain the release plate 157 between the leg 152 and the end 154 of the control arm 144. The release plate 157 is free to be rocked by the pin 160, and a certain degree of such rocking motion can be accommodated without releasing the contact arm 126. The time of closing of the contacts 124 and 125 can thus be regulated by varying the free rocking motion of the plate 157, i.e. the amount of movement of the plate 157 which is tolerated before release of the arm 126. For this purpose, the opening in the base portion 165 of the support bracket 150 through which the screw 166 extends is in the form of a slot, to allow movement of the bracket 150 to the right or left as viewed in Figure 19, for example. To control this movement, the base portion 165 of the support bracket 150 has a forwardly turned flange portion 168 adjacent one edge of the frame plate 43 and a first adjustment screw 169 extends through the flange portion 168 and is threaded into the plate 43 with a second adjustment screw 170 threaded through the flange portion 168 and engageable with the edge of the plate 43. Thus, by adjustment of the screws 169 and 170, the support bracket 150 may be moved to the right or to the left as viewed in Figure 19. After such adjustment, the bracket can be locked in position by the screws 170, 169 and 166.

*Operation*

For reasons to be explained in detail later, the normal position of the contacts 124 and 125 is closed, i.e. the positions of Figure 28. When the clock 30 is energized, as by connecting a suitable direct current source, such as a battery, between the terminal post 59 and the frame of the mechanism, the coil 38 will be energized. The armature element 35 will be moved in one or the other direction of oscillation, the direction of initial movement depending upon the position of the armature relative to the pole pieces 36 and 37.

The contacts 124 and 125 remain closed for a relatively limited displacement of the shaft 90 from its neutral position at which the armature 35 is positioned symmetrically between the pole pieces 36 and 37. A relatively greater displacement of the shaft 90 is required to open the contacts by the cam faces 141, 142 of the cam 139.

Upon deenergization of the device, the armature 35 continues to oscillate, because of its inertia, the arcuate displacement of the armature diminishing. Initially upon deenergization, the cam faces 141 and 142 and the pin 160 sequentially open and close the contacts 124, 125, but as the magnitude of armature displacement becomes less, the cam faces 141 and 142 do not open the contacts 124, 125, although the pin 160 will rock the release plate 157 to close the contacts. Thus, the contacts remain closed when the armature comes to rest.

Of course, the armature is never exactly centralized between the pole pieces, but will lie approximately centrally therebetween. This random positioning of the armature 35 causes the armature to move initially in accordance with its position and without effect upon the operation of the device.

Considering first clockwise movement of the armature element 35, the cam surface 142 of the cam member 139 will engage the end portion 138 of the contact arm 126 to move the contact 124 out of engagement with the contact 125, and thus deenergize the coil 38. Rotation of the armature element 35 may continue in a clockwise direction from the kinetic energy resulting from its motion, but eventually due to the restoring force of the spring 39, the armature element 35 will be urged back in a counterclockwise direction. When the armature element 35 and shaft 90 rotate to a position with the face 142 of the cam member 139 opposite the end portion 138 of the contact arm 126, the arm 126 will not move back to engage the contact 124 with the contact 125, due to the frictional engagement of the arm 144 with the edge of the slot 143 in the contact arm 126. However, with further counterclockwise movement of the armature element 35, the pin 160 will engage the leg 158 of the rockable device 157 to effect a clockwise movement of the device about its forward edge portion, to move the forward end of the control arm 144, so as to reduce the frictional engagement pressure with the edge of the slot 143, and allow the contact arm 126 to move to engage the contact 124 with the contact 125.

This will reenergize the coil 38 of the electromagnet to exert a force which cooperates with the kinetic energy of the element 35 in effecting further counterclockwise movement of the element 35.

With such further counterclockwise movement, the face 141 of the cam member 139 will engage the end portion 138 of the contact arm 126 to move the arm 126 to a position such as illustrated in Figure 27 and disengage the contact 124 from the contact 125. The counterclockwise movement will continue until stopped by the increasing force of the spring 39, after which the armature element 35 will move back in a clockwise direction from the force of the spring 39.

In this clockwise movement, when the shaft 90 reaches a position such that the face 141 of the cam member 139 is opposite the end portion 138 of the contact arm 126, the arm 126 will not move into contact-engaging position due to the frictional engagement between the control arm 144, engagement of the control arm 144 with the edge of the slot 143, and the contacts will not be reengaged until with further clockwise movement the pin 160 actuates the rockable device 157. This cycle will, of course, be repeated over and over again, and the movement will oscillate at an amplitude dependent upon the relation of the energy supplied by the electromagnet to the energy dissipated as heat from friction, etc. While the amplitude of oscillation may vary with variations in the supply of voltage, the elapsed time of each cycle of operation will remain the same, so that the accuracy of the instrument will not be affected.

It should be noted that the mechanism 41 which converts the oscillatory movement of the shaft 90 into rotational movement of the wheel 66 is so related to the contacting assembly 40 that the drive is imparted to the wheel 66 during substantially the same portions of the cycle that the coil 38 is energized. Accordingly, the effect on the natural vibratory movement of the element 35 is minimized, to thus minimize the effect on the accuracy of operation of the instrument. By virtue of the contact arrangement of this invention, it is possible to accurately adjust the portions of each cycle when the contacts are closed, so as to achieve this highly accurate operation.

When the clock is disconnected from the source of electricity, the electromagnet will, of course, no longer impart driving force to the oscillatory element 35 and the amplitude of oscillation will gradually reduce. The friction between the end 138 of the contact arm 126 and the cam member 139 is low enough relative to the restoring force exerted by the spring 39 that if the oscillatory element 35 swings in either direction to an extent sufficient to open the contacts, it will swing back in the reverse direction to an extent sufficient to actuate the device 157 and close the contacts. Accordingly, if the clock is deenergized, the oscillatory element will ultimately reach a position with the contacts closed, so that when the clock is reenergized, the coil 38 will be energized and operation of the oscillatory mechanism must be initiated. Hence, there is no "dead" position of the mechanism.

It will be understood that modifications and variations may be effected without departing from the spirit and scope of the novel concepts of the present invention.

I claim as my invention:

1. In an electric clock or the like, an oscillatory element movable in one direction from a first position through a neutral position to a second position and in a reverse direction back through said neutral position to said first position, electromechanical transducer means for acting on said element to move it in either direction away from said neutral position circuitry including contact means biased toward one another for energizing said transducer means, a restraining member movable into and out of position to maintain said contacts open, an actuator movable in synchronism with said oscillatory element, said member having a portion in the path of said actuator to be actuated in one direction when the oscillatory element moves in one direction and in a reverse direction when the oscillatory element moves in the reverse direction, the contact means being closed when said oscillatory element moves to a certain extent in either direction, and cam means actuated by said element to restore said contacts to biased position.

2. In an electric clock or the like, an oscillatory element movable in one direction from a first position through a neutral position to a second position and in a reverse direction back through said neutral position to said first position, electromechanical transducer means for acting on said element to move it in either direction away from said neutral position, circuitry including contact means biased toward one another for energizing said transducer means, latch means for retaining said contacts apart, and means for releasing said latch means when said element moves in either direction to a contact-closing position beyond the neutral position and means for opening and restoring said contact means to latched position when said element moves to a contact-opening position beyond the contact-closing position.

3. In an electric clock or the like, a pivotal oscillatory element urged by a restoring force toward a neutral position intermediate its range of oscillation, electromechanical transducer means for acting on said element in opposition to said restoring force, circuitry including contact means biased toward closed position for energizing said transducer means, releasable frictional latch means for restraining said contacts from closing, trigger means for releasing said latch means, and means moved in synchronism with said element to actuate said trigger means when said element moves in either direction to a selected contact-closing position beyond the neutral position and for opening said contact means when said element moves to a contact-opening position beyond the closing position, said restoring force being high enough relative to frictional forces opposing movement of said element to insure movement of said element in either direction beyond the contact-closing position following movement in the other direction beyond the contact-opening position.

4. In an electric clock or the like, an oscillatory element movable in one direction from a first position through a neutral position to a second position and in a reverse direction back through said neutral position to said first position, electromechanical transducer means for acting on said element to move it in at least one direction away from said neutral position, contact means for energizing said transducer means including a contact member urged toward a contact-closing position, cam means carried by said oscillatory element for moving said contact member toward a contact-opening position on movement of said element to a certain extent in at least said one direction beyond said neutral position, a control member for releasably maintaining said contact member in said contact-opening position, and means for actuating said control member to allow movement of said contact member to said contact-closing position on movement of said element in at least said one direction beyond said neutral position.

5. In an electric clock or the like, an oscillatory element movable in one direction from a first position through a neutral position to a second position and in a reverse direction back through said neutral position to said first position, electromechanical transducer means for acting on said element to move it in at least one direction away from said neutral position, contact means for energizing said transducer means including a contact member urged toward a contact-closing position, cam means carried by said oscillatory element for moving said contact member toward a contact-opening position on movement of said element to a certain extent in at least said one direction beyond said neutral position, a control member urged into frictional engagement with said contact member for releasably maintaining said contact member in contact-opening position, and means for actuating said control member out of frictional engagement with said contact member to allow movement of said contact member to said closing position on movement of said element in said one direction beyond said neutral position.

6. In an electric clock or the like, an oscillatory element movable in one direction from a first position through a neutral position to a second position and in a reverse direction back through said neutral position to said first position, electromechanical transducer means for acting on said element to move it in at least one direction away from said neutral position, contact means for energizing said transducer means including a contact member urged toward a contact-closing position, cam means carried by said oscillatory element for moving said contact member toward a contact-opening position on movement of said element to a certain extent in at least said one direction beyond said neutral position, a control member urged into frictional engagement with said contact member for releasably maintaining said contact member in contact-opening position, an actuator carried by said element, and a reciprocable member arranged for actuating said control member out of frictional engagement with said contact member and having a portion in the path of movement of said actuator.

7. In an electric clock or the like, an oscillatory element movable in one direction from a first position through a neutral position to a second position and in a reverse direction back through said neutral position to said first position, electromechanical transducer means for acting on said element to move it in at least one direction away from said neutral position, contact means for energizing said transducer means including a contact member urged toward a contact-closing position, cam means carried by said oscillatory element for moving said contact member toward a contact-opening position on movement of said element to a certain extent in at least said one direction beyond said neutral position, a control member for releasably maintaining said contact member in said contact-opening position, means for actuating said control member to allow movement of said contact member to said contact-closing position on movement of said element in at least said one direction beyond said neutral position, and means independent of said contact member and cam means for adjusting the point of actuation of said control member in relation to the position of said oscillatory element.

8. In an electric clock or the like, an oscillatory element movable in one direction from a first position through a neutral position to a second position and in a reverse direction back through said neutral position to said first position, electromechanical transducer means for acting on said element to move it in at least one direction away from said neutral position, contact means for energizing said transducer means including a contact member urged toward a contact-closing position, cam means carried by said oscillatory element for moving said contact member toward a contact-opening position on movement of said element to a certain extent in at least said one direction beyond said neutral position, a control member for releasably maintaining said contact member in said contact-opening position, means for actuating said control member to allow movement of said contact member to said contact-closing position on movement of said element in at least said one dierction beyond said neutral position, means for adjusting the position of said contact member to adjust the point of actuation thereof in relation to the position of said oscillatory element, and means independent of said contact member and cam means for adjusting the point of actuation of said control member in relation to the position of said oscillatory element.

9. In an electric clock or the like, an electromagnet having a pair of poles, an oscillatory armature element movable in one direction from a first position through a neutral magnetic position transverse to the magnetic flux path between said poles to a second position and in a reverse direction back through said neutral position to said first position, circuitry including contacts biased toward closed position for energizing said electromagnet, latch means for restraining said contacts in open, biased position, and means for releasing said latch means when said element moves in either direction to a contact-closing position beyond said neutral magnetic position and for opening said contact means when said element moves to a contact-opening position beyond the closing position, said element being urged by a restoring force to a position slightly displaced from said neutral magnetic position with said restoring force being high enough relative to frictional forces opposing movement of said element to insure movement of said element in either direction beyond the contact-closing position following movement in the other direction beyond the contact-opening position.

10. In a timing apparatus, an oscillatably mounted armature element, electrically energizable pulsing means for oscillating said element including pole pieces between which said element is mounted, an electric circuit for energizing said pole pieces and including a pair of relatively movable contacts normally urged to a closed position at which said means is energized, first cam means carried by said oscillatable element to open said contacts and to release said contacts for closing movement, friction means preventing closing movement of said contacts even though released for movement by said first cam means, and second cam means also carried by said element and operable only after operation of the first cam means for overruling said friction means to allow said contacts to close.

11. In a timing apparatus including an electromagnetically movable element and an electric circuit for moving said element, the improvements of a pair of contacts provisionally biased closed to complete said circuit, cam means carried by said element to sequentially open and release said contacts, trigger releasable friction means retaining said contacts in open condition upon release by said cam means, and means carried by said element to trigger said friction means for releasing said contacts to accommodate their closing.

12. In a timing apparatus including an electromagnetically actuatable element and an electric circuit for actuating said element, the improvements of a fixed contact and a movable contact, an arm carrying said movable contact, means biasing said arm toward the fixed contact whereby said contacts are provisionally closed for starting the apparatus, means opposing said biasing means and actuated by said element for moving said arm away from the fixed contact, latch means retaining said arm away from said contact, additional means responsive to actuation of said element for releasing said latch means, means for adjusting the position of the fixed contact relative to the movable contact, means for adjusting the engagement of the latch means with the arm of the movable contact, and means for adjusting the latch releasing means relative to said element.

13. In an electric clock or the like, an element mounted for oscillation, said element being biased toward an intermediate neutral position, electromechanical transducer means for acting on said element to move it in either direction away from said neutral position, circuitry for said transducer means including relatively movable contacts, a spring arm carrying one of said contacts and biasing said one contact toward closed, engaging position with the other of said contacts, means normally restraining said arm in open position, and control means operated by oscillation of said element for releasing said restraining means to permit closing of said contacts and energization of said transducer, said control means including means for returning said arm to open position of said contacts following each energization of said transducer.

14. A device of the character described in claim 13, wherein said restraining means comprises an adjustable element frictionally engaging a part of one of said contacts.

References Cited in the file of this patent

UNITED STATES PATENTS

| | | | |
|---|---|---|---|
| 324,666 | Diehl | Aug. 18, | 1885 |
| 806,636 | Carlstedt | Dec. 5, | 1905 |
| 1,926,833 | Bechtold | Sept. 12, | 1933 |
| 1,991,839 | Favre-Bulle | Feb. 19, | 1935 |
| 2,109,953 | Bates | Mar. 1, | 1938 |
| 2,191,074 | Herrington | Feb. 20, | 1940 |
| 2,240,927 | Geisslinger | May 6, | 1941 |
| 2,340,182 | Gibbs | Jan. 25, | 1944 |
| 2,459,930 | Fink | Jan. 25, | 1949 |
| 2,523,298 | Haydon | Sept. 26, | 1950 |